United States Patent [19]

Frye

[11] Patent Number: 4,733,742

[45] Date of Patent: Mar. 29, 1988

[54] TWO-WHEELED STEERABLE VEHICLE

[76] Inventor: Norman V. Frye, R.R. #5, Box #60, Davenport, Iowa 52806

[21] Appl. No.: 40,392

[22] Filed: Apr. 20, 1987

[51] Int. Cl.<sup>4</sup> ..................... B60K 17/358; B62D 61/02
[52] U.S. Cl. .................................... 180/223; 180/254; 280/103; 280/267
[58] Field of Search ............... 180/219, 223, 252, 253, 180/254; 280/267, 269, 268, 263, 95 R, 98, 103

[56] References Cited

U.S. PATENT DOCUMENTS

| | | | |
|---|---|---|---|
| 52,832 | 2/1866 | Drew | 280/103 |
| 2,816,773 | 12/1957 | Miller | 280/103 |
| 3,298,453 | 1/1967 | Bobard | 180/223 X |
| 4,651,844 | 3/1987 | Matsuda et al. | 180/219 |

FOREIGN PATENT DOCUMENTS

| | | | |
|---|---|---|---|
| 640429 | 5/1962 | Canada | 180/223 |
| 4491 | 1/1902 | Denmark | 280/267 |

Primary Examiner—John J. Love
Assistant Examiner—Charles R. Watts
Attorney, Agent, or Firm—Henderson & Sturm

[57] ABSTRACT

A two-wheeled, self-propelled and steerable vehicle especially designed for travel over varying terrain, including pavement, rough and rocky ground, under brush and areas dotted with water. The vehicle has a fore-and-aft body supported on front and rear wheels, both of which are steerable in unison in what may be termed articulated fashion as distinguished from so-called crab steering. Each of the wheels is steerable by a wheel mounting arrangement that eliminates the conventional fork and uses instead a split shaft and splined sleeve interconnection on which the wheel is journaled. Right and left links interconnect the sleeve respectively to proximate right and left fore-and-aft movable shaft carriers for controlling the position of the sleeve as the wheel is steered, thus increasing the range of steerability without increasing the width of the body within which the wheel is confined. Preferably, both wheels are powered by hydraulic motors.

7 Claims, 9 Drawing Figures

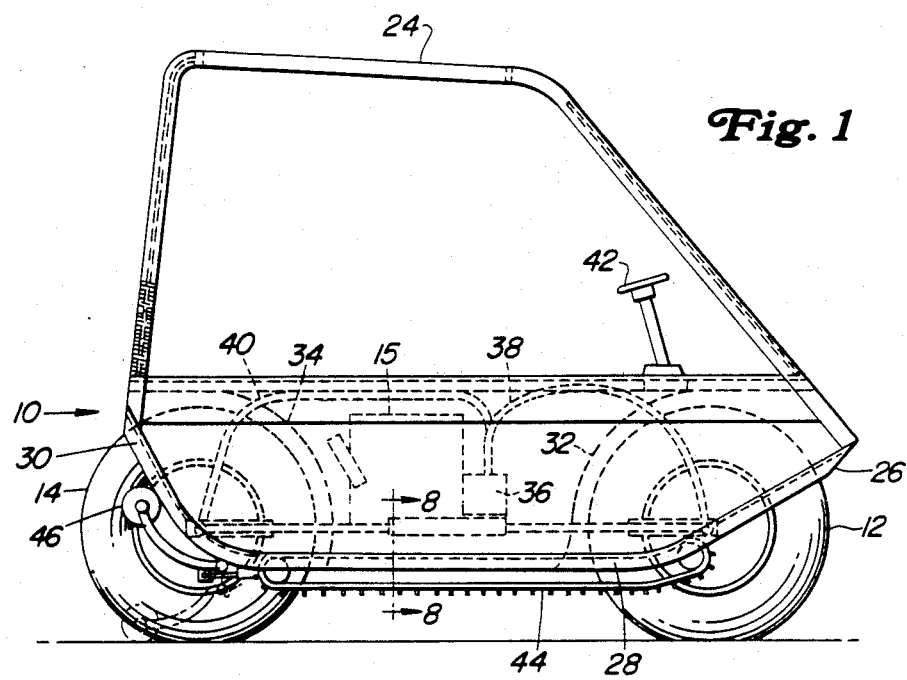
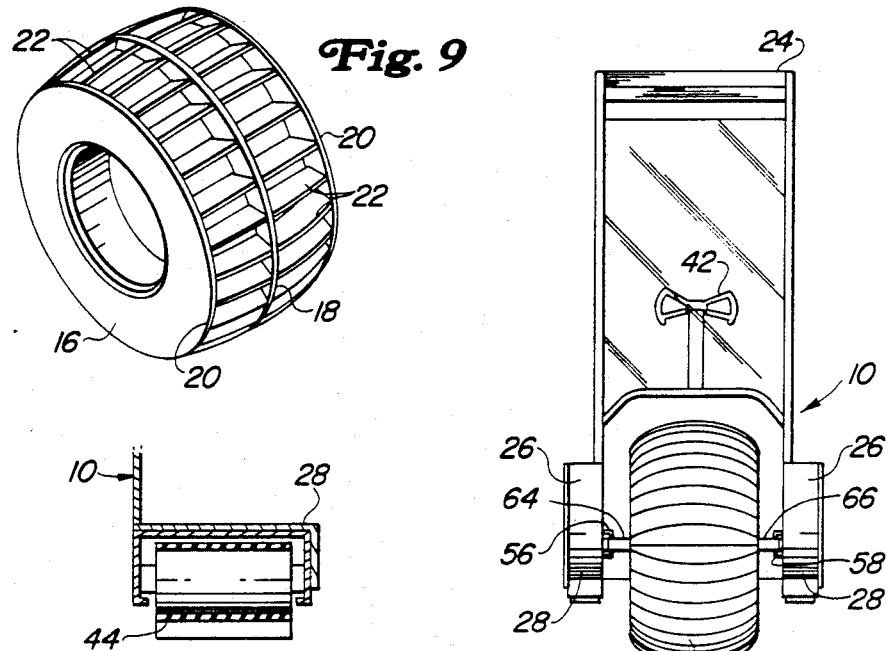

TWO-WHEELED STEERABLE VEHICLE

BACKGROUND AND SUMMARY OF THE INVENTION

The disclosures in the U.S. patents to Frey, U.S. Pat. Nos. 4,157,739 and 4,357,893 are based on a multi-terrain vehicle having powered front and rear wheels, both of which are sterrable in articulated fashion. These patents also disclose basic body structure housing in the form of a bell or shell-like structure housing a power plant and fan which creates a downward air pressure enabling the vehicle to more readily accommodate varying types of terrain. The foregoing, plus tires with special treads, increase the versatility of the vehicle in the transversing of land or water.

One of the problems encountered in the use of vehicles of the type just referred to is the mounting of the wheels on steering forks. It has been found that a fork requires clearance not only above the wheel or tire but between the top of the fork and the underside of the body, thus increasing the height of the body above the ground. Further, the fork, whether single or double-legged, tends to cause accumulation of mud, etc. between the wheel and the fork leg which requires frequent removal in order for the machine to maintain top performance.

According to the present invention, the forks are eliminated and are replaced, preferably for each wheel, with a split shaft and splined sleeve arrangement. The two sections of the split shaft are preferably splined to mate with the internal splines on the sleeve and are arranged end-to-end on a common axis transverse to the line of travel of the machine. The inner ends of the slidable shafts are spaced axially apart and the outer ends are connected respectively to right and left carriers that are mounted on side supports of the body for relative fore-and-aft movement, moving the shafts respectively with them so that, during steering, the common axis of the shafts and sleeve varies angularly in, for example, a horizontal plane, since the outer end of each shaft, although movable with its carrier is also pivoted to that carrier on, for example, an upright axis.

Another feature is that each sleeve journals a pneumatic-tired wheel, particularly of a specific tread configuration. The wheel is confined against axial shifting relative to the sleeve and thus can partake of axial sliding of the sleeve on the shaft. This action is controlled, however, by linkage means connected preferably to opposite ends of the sleeve and to the fore-and-aft movable carriers, respectively. The arrangement is such that, for instance, rearward movement of the right hand carrier and forward movement of the left hand carrier, as in making a right turn, causes the sleeve and wheel to move toward the right side of the body, thus increasing the wheel clearance or room in which the wheel can be steered and accordingly reducing the steering radius.

A further feature is that the wheels are driven respectively by hydraulic motors. Overall, the inventive design results in a compact, efficient design that improves the performance and versatility of the vehicle, especially in the rather rough environment for which the machine is intended.

Further features and advantages of the invention will become apparent as a preferred embodiment of the invention is disclosed in detail in the ensuing description and accompanying sheets of drawings.

DESCRIPTION OF THE DRAWINGS

FIG. 1 is a side elevation of one form of vehicle embodying the invention.

FIG. 2 is a front elevation of the same.

FIG. 8 is a section along the line 8—8 of FIG. 1.

FIG. 9 is a perspective of one form of tire tread for the wheel tires.

DETAILED DESCRIPTION OF A PREFERRED EMBODIMENT OF THE INVENTION

Figure 3:
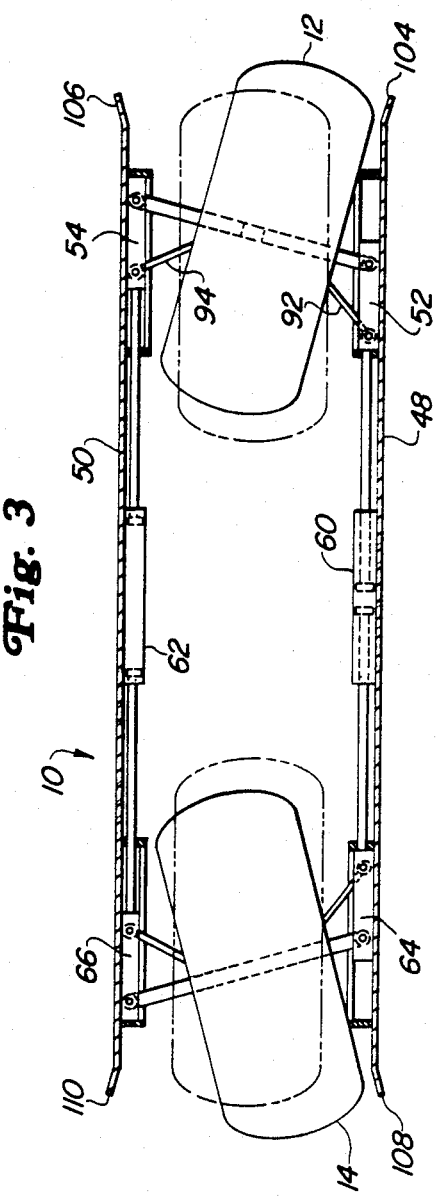
FIG. 3 is a plan view, enlarged over FIGS. 1 and 2 and with upper portions removed, showing the front and rear wheels, in straight-ahead positions in broken lines and as steered for a right turn in full lines.

Familiarity with the structures disclosed in the patents referred to above will be assumed and reference may be had thereto for an understanding of the background design and functions. As in those patented disclosure, the vehicle or machine here has a relatively narrow, fore-and-aft body 10 borne by front and rear wheels 12 and 14, both preferably powered as by an internal combustion engine 15 (FIG. 1) as in the patented disclosures. Each wheel is preferably fitted with a pneumatic rubber tire such as that designated by the numeral 16 in FIG. 9. That tire has a dual tread 18 divided by an annular center of median rib 20 and bordered by outer annular ribs 22 which serve to provide for better travel of the tire over pavement or hard ground. The ribs are spanned by cross treads in the form of paddles 22 for improving the performance of the vehicle over water. The ability of the vehicle in general to accommodate watery stretches in its path is enhanced by giving the body a shape in the form of an inverted U; i.e., bell- or shell-like as best seen in the prior patents as well as in FIG. 2. The power plant is contained within the body and by means of a fan (not shown but to be seen in the prior patents) creates a down pressure that increases the "floatation" of the vehicle. The flotation is further improved by the tires 16, which are relatively wide and of the low-pressure type.

In the vehicle disclosed here, the body is equipped with a canopy-like top 24 which may incorporate roll-over protection which also enables the vehicle to brush aside low, over-hanging branches etc. Moreover, the front of the body may have upwardly and forwardly sloping skids 26, one at each side of the front wheel and provided for the purpose of enabling the vehicle to contend adequately with brush and like obstacles. With reference to this last-mentioned aspect, the body is equipped at each side with fore-and-aft runners 28 which are extensions of the skids and which terminate at rear ends in up-turned portions 30 which serve also as skids during rearward travel of the machine. As further contributions to the bell-like nature of the body 10, front and rear fenders 32 and 34 lie respectively behind and in front of the front and rear wheels (dotted lines, FIG. 1). Also apparent from FIG. 1 is the representation of a hydraulic pump 36 and hydraulic lines 38 and 40 for powering the front and rear wheels, the description of the details of one of the wheel motors being postponed to coincide with the later description of the wheel construction and mounting. Representative hydraulic systems are shown in the prior patents by way of example, and the details may be varied widely and form no specific part of the present invention. The wheels are also hydraulically steered, as by a steering control number 42 suitably connected by valves and lines (not shown) to steering motors to be described later. Here again the details are not significant and are referred to only by way of example.

Each of the runners 28 is hollow (FIG. 8) for the purpose of containing an endless track or belt 44 which extends fore and aft and which is associated with appropriate rollers so as to turn up at the front. These belts may be driven from the vehicle engine by any suitable means, not shown because the details are not important in the present case. The belts add to the ability of the machine to traverse rough terrain. For augmenting the stability of the vehicle at low speeds and for parking, the body has at each side wheeled out-rigger means 46, normally carried in raised position (full lines, FIG. 1) but capable of being lowered to park or stabilizing position (dotted lines, same figure). If desired, any suitable means may be provided to cause automatic lowering of the outriggers in response to a decrease in vehicle travel speed to a pre-selected value; i.e., a speed so slow that the vehicle may tend to tilt laterally in excessive amounts.

Figure 5:
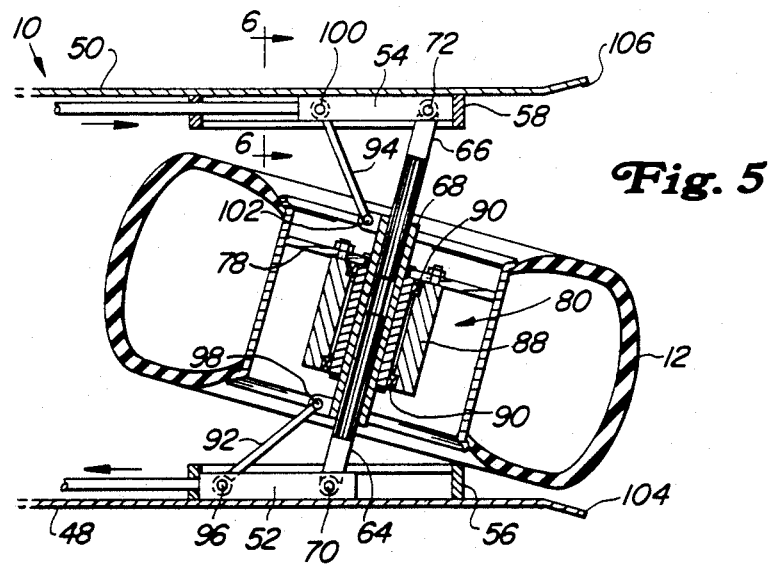
FIG. 5 is a sectional view, on a still further enlarged scale, showing the details of the wheel mounting.
Figure 6:
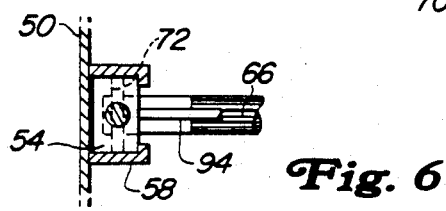
FIG. 6 is a fragmentary view, partly in section as seen along the line 6—6 on FIG. 5, showing one of the shaft-to-carrier connections.

The nature of the body 10 is such that it has right and left fore-and-aft sides or supports 48 and 50, respectively. These are rather closely spaced apart in order to narrow the vehicle width but the spacing is still adequate to accommodate the front and rear wheels. As noted in the prior Frye patents, the wheels are mounted by means of steerable forks. The present invention provides a marked and novel departure from that type of wheel mounting. Since the present mounting arrangement for both wheels is the same, only that for the front wheel will be described in detail, reference being had primarily to FIGS. 5, 6 and 7.

Figure 4:
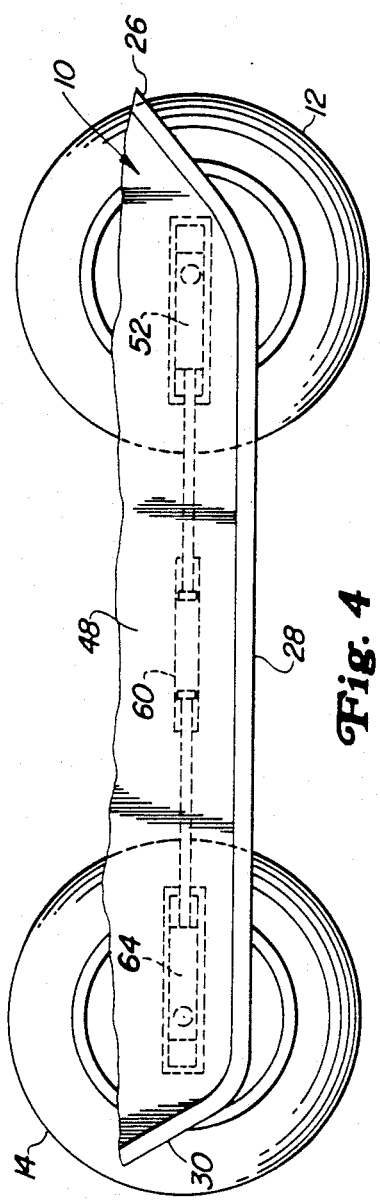
FIG. 4 is a side view of the structure appearing in FIG. 3 but with wheels in straight-ahead position.

The right and left supports 48 and 50 are shown in this case as walls and have respectively mounted on their inner faces right and left carriers 52 and 54. The means mounting these carriers on their respective supports for independent fore-and-aft movement may comprise right and left channel members 56 and 58 in which the respective carriers are slidable. Although the movement in this case is horizontal, provision may be made for movement at an angle, for example, to add camber to the steering action. On the basis of what is disclosed here, such changes are within the scope of the invention. The carriers are shown here as being movable by force-exerting means, such as right and left dual fluid motors 60 and 62 (FIGS. 3 and 4). In the present case, these motors are also connected respectively to right and left rear carriers 64 and 66 so that the wheels are steerable jointly to achieve articulated steering. Obviously, other force-exerting means may be substituted for those shown and the illustration in that respect is merely exemplary. The hydraulic system for the motors is also capable of various embodiments; hence, no particular circuit is shown. Suffice it to say, that the motors are under control of the steering member 42, previously described. The carrier channels are closed at opposite ends to provide stops or limits on carrier movement.

The wheel mounting system itself is characterized by a split shaft and sleeve arrangement, involving right and left shafts 64 and 66 arranged on a common axis transverse to the fore-and-aft extent of the body 10. The shafts are externally splined to axially slidably mesh or interfit with an internally splined sleeve 68. The shafts are arranged for fore-and-aft movement with their respective carriers but have swinging movement relative to the carriers, a dual connection with the carriers involving right and left vertical pivots 70 and 72. From the description thus far, it will be seen that, as the carriers move fore and aft relative to each other, the distance between the pivots 70 and 72 varies, this action being permitted by the slidability of the shafts within the sleeves because of the splines. Obviously, intermeshing means other than but the equivalent of the splines may be used. Also apparent at this point, is that the sleeve is, without more, fairly free to move axially; conversely, the inner ends of the shafts, as seen best at 74 and 76 in FIG. 7, may move toward and away from each other. In a preferred construction, the shafts and sleeve are designed so that, so long as the outer ends of the shafts are connected to their respective carriers by their respective pivots 70 and 72, the shafts cannot escape the sleeve.

Figure 7:
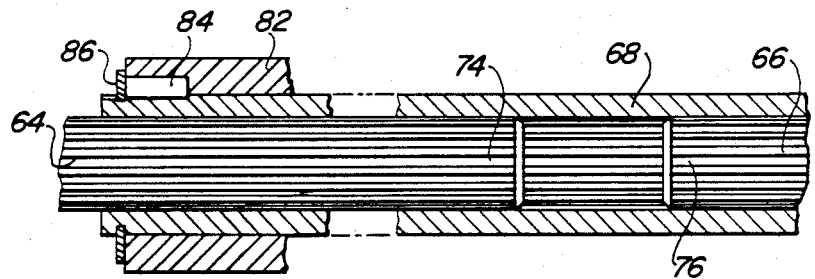
FIG. 7 is an enlarged fragmentary sectional view showing portions of the shafts, sleeve and hub arrangement.

The front wheel 12 has a dished wheel body 78 which is journaled on the sleeve 68 by means including a hydrostatic motor 80 having an internal part or stator 82 fixed to the sleeve, as by a key 84 (FIG. 7). The stator is also fixed against relative axial movement on the sleeve, as by one or more snap rings as at 86 in FIG. 7. The rotor of the motor 80, as at 88, is of course hydraulically associated with the stator as well as being journaled thereon by bearings 90, and is secured to wheel body thereby journaling the wheel on the sleeve. Because of the snap rings 86, the wheel must move axially only to the extent that the sleeve can move axially on the shafts, a movement that is controlled, as will presently appear.

Control of the axial movement of the wheel is important in order to enable adequate steering within the rather narrow space provided by the spacing between the right and left body walls and also to prevent the wheel from free axial "ranging" from side to side. This control is achieved by linkage means including, preferably, right and left control links 92 and 94 connected respectively between opposite ends of the sleeve 68 and the right and left carriers 52 and 54. In the case of the right hand link, pivotal connections are provided at 96 and 98, and similar pivots are provided at 100 and 102 for the left side.

Assuming a straight-ahead position of the wheel 12, the carriers will be centrally positioned in their respective channels and the wheel will be centrally disposed between the body side walls. When a right hand turn is desired, the right hand carrier is moved to the rear and the left hand carrier is simultaneously moved forwardly, which produces the position shown in FIGS. 3 and 5. As the right hand carrier moves to the rear, the link 92 operates in tension to draw the wheel to the right as the wheel and sleeve slide axially on the splined shafts. At the same time, forward movement of the left hand carrier causes the left link 94 to exert a pushing force on the wheel conjointly with the pulling force of the link 92. This action results in an increase in the space between the rear part of the wheel and the inner side of the left hand wall, which means that the right hand turning radius may be reduced. The forward end of the right hand side wall is flared outwardly at 106 to provide added clearance for the front part of the steered wheel. A symmetrical result occurs for steering to the left, the left wall being flared also at 106. Similar flares 108 and 110 are provided at the rear of the side walls, since, as previously described, the wheel mountings are the same but symmetrical because of the nature of the steering; i.e., articulate. The details of the rear wheel sleeve, shafts, linkages etc. will be apparent from what has gone before and need not be repeated.

Features and advantages other than those outlined herein will readily occur to those versed in the art, as will many modifications in the preferred embodiment of the invention disclosed, all without departure from the spirit and scope of the invention.

I claim:

1. In a ground vehicle having a fore-and-aft body including transversely spaced apart, right and left, fore-and-aft supports, steerable wheel structure, comprising: right and left transversely spaced apart carriers disposed closely adjacent the right and left supports, respectively; right and left means mounting the right and left carriers respectively on the supports for selective fore-and-aft movement of the carriers relative to the supports and relative to each other; right and left transversely coaxial shafts extending respectively from outer ends adjacent to the respective carriers toward each other to respective inner ends proximate to each other; right and left means respectively connecting the shaft outer ends to the carriers for fore-and-aft movement with the respective carriers and including articulate connections of the outer ends to the respective carriers for enabling fore-and-aft swinging of the shafts relative to the respective carriers; a sleeve coaxially received by the shafts and spanning the shaft inner ends; means interconnecting the sleeve and shafts for rotation of said sleeve and said shafts in unison while enabling relative axial movement of the shafts with respect to the sleeve as the shaft inner ends move axially toward and away from each other in response to fore-and-aft movement of either or both the carriers; a wheel coaxially journaled on the sleeve; means operative between the wheel and sleeve to hold the wheel against axial shifting relative to the sleeve; and link means articulately interconnecting one of said left and right carriers to the proximate portion of the sleeve for controlling the axial position of the sleeve and wheel means as either or both of the carriers move fore and aft.

2. The steerable wheel structure of claim 1, including second link means connecting the other of said left and right carriers to the sleeve for combining with the first named link means to control the axial position of the sleeve as aforesaid.

3. The steerable wheel structure of claim 2, in which the link means, carrier and sleeve are so constructed and arranged that the link means exerts a rightward force on the sleeve as the right and left carriers move respectively rearwardly and forwardly and a leftward force on the sleeve as the left and right carriers move respectively forwardly and rearwardly.

4. The steerable wheel structure of claim 1, including a hydraulic motor coaxial with the wheel, sleeves and shaft and having a rotary part affixed to the wheel and a fixed part fixed to the sleeve.

5. The steerable wheel means of claim 1, in which the means interconnecting the shafts and sleeve include intermeshing relatively axially movable portions respectively on the shafts and sleeves.

6. The steerable wheel structure of claim 5, in which the intermeshing portions are internal splines on the sleeve and external splines on the shafts.

7. The steerable wheel structure of claim 1 in which each of the means mounting the carriers is a fore-and-aft channel element mounted on the side of the associated support that faces the wheel, and each carrier is slidable in its channel element.

* * * * *